US012745779B2

(12) United States Patent
Langenfeld et al.

(10) Patent No.: US 12,745,779 B2
(45) Date of Patent: Sep. 29, 2026

(54) INDUSTRIAL PROCESS FOR CONTINUOUS PRODUCTION OF INVERSED LAMINATED DOUGH

(71) Applicant: VAMIX NV, Ghent (BE)

(72) Inventors: Pierre Langenfeld, Ottersthal (FR); Eline Honoré, Ghent (BE); Thomas Josse, Torce (FR); Roel Van Der Meulen, Ghent (BE)

(73) Assignee: VAMIX NV, Ghent (BE)

( * ) Notice: Subject to any disclaimer, the term of this patent is extended or adjusted under 35 U.S.C. 154(b) by 599 days.

(21) Appl. No.: 18/008,236

(22) PCT Filed: Jun. 11, 2021

(86) PCT No.: PCT/EP2021/065805
§ 371 (c)(1),
(2) Date: Dec. 5, 2022

(87) PCT Pub. No.: WO2021/250246
PCT Pub. Date: Dec. 16, 2021

(65) Prior Publication Data

US 2023/0240308 A1 Aug. 3, 2023

(30) Foreign Application Priority Data

Jun. 11, 2020 (FR) ...................................... 2006104

(51) Int. Cl.
*A21D 13/16* (2017.01)
*A21C 3/02* (2006.01)
*A21C 3/04* (2006.01)

(52) U.S. Cl.
CPC .............. *A21D 13/16* (2017.01); *A21C 3/022* (2013.01); *A21C 3/04* (2013.01)

(58) Field of Classification Search
CPC .......... A21D 13/16; A21C 3/022; A21C 3/04; A21C 3/02; A21C 9/045
See application file for complete search history.

(56) References Cited

U.S. PATENT DOCUMENTS

| | | | |
|---|---|---|---|
| 4,113,819 | A | 9/1978 | Hayashi et al. |
| 4,416,910 | A | 11/1983 | Hayashi et al. |
| 5,221,546 | A | 6/1993 | Moore et al. |
| 5,576,043 | A | 11/1996 | Stankus et al. |

FOREIGN PATENT DOCUMENTS

| | | | | | |
|---|---|---|---|---|---|
| CA | 2404239 | C * | 2/2011 | | .............. A21D 2/26 |
| CN | 106455588 | A | 2/2017 | | |
| CN | 107567279 | A | 1/2018 | | |
| EP | 0559544 | A1 | 9/1993 | | |
| EP | 0 748 589 | A1 | 12/1996 | | |
| FR | 2303479 | A1 | 10/1976 | | |
| FR | 2 532 819 | A1 | 3/1984 | | |
| FR | 2 559 029 | A1 | 8/1985 | | |
| FR | 2 568 099 | A1 | 1/1986 | | |
| FR | 0 559 544 | A1 | 9/1993 | | |
| FR | 3 040 861 | A1 | 3/2017 | | |
| JP | 2002101810 | A | 4/2002 | | |
| JP | 2015073470 | A | 4/2015 | | |
| WO | 9526641 | A1 | 10/1995 | | |
| WO | WO-2020040760 | A1 * | 2/2020 | | .............. A21D 2/18 |

OTHER PUBLICATIONS

Bakers Journal. Jan. 2019. Obtained from URL: <https://www.bakersjournal.com/wellbakes-softfeed-extruder-takes-the-punishment-out-of-dough-7575/> on Jun. 16, 2025. (Year: 2019).*
Berton et al. Powder Technology 128 (2002) 326-331. (Year: 2002).*
Macedo et al. Fluids 5.2 (2020): 50. (Year: 2020).*
International Search Report and Written Opinion date Nov. 19, 2021 issued in PCT International Patent Appln. No. PCT/EP2021/065805.
Anonymous: "La pâte feuilletée inversée, l'essayer c'est l'adopter", Apr. 8, 2008 (Apr. 8, 2008), XP055789741, Retrieved from the Internet <URL:https://www.mercotte.fr/2008/04/08/la-pate-feuilletee-inversee/#:~:text=La%20d%C3%A9trempe%20est%20%C3%A0%201,pour%20la%20p%C3%A2te%20feuillet%C3%A9e%20traditionnelle.> [retrieved on Mar. 24, 2021].
Anonymous: "Pâte feuilletée inversée", Jan. 17, 2014 (Jan. 17, 2014), XP055789739, Retrieved from the Internet <URL:https://www.meilleurduchef.com/fr/recette/pate-feuilletee-inverse.html> [retrieved on Mar. 24, 2021].
Chinese Office Action Issued on Mar. 26, 2024 in Respect to Counterpart Chinese Patent Application No. 202180041837.9 and its English Translation.
Bone Bean Catnip,[tickle your OCD] Amazing Food Cutting Processing Croissant Factory, Website: https://b23.tv/f62bTnn::beep, Croissant Production Line, Nov. 3, 2017 (Nov. 3, 2017), pp. 1-16 (Reference is included in the Office Action).
Notice of Reasons for Refusal, Dated Jul. 1, 2025, Issued in Japanese patent application No. 2022-576213, and its English translation.
Pâte feuilletée "inversée" La recette avec photos. Meilluer du Chef. ttps://www.meilleurduchef.com/fr/recette/pate-feuilletee-inverse.html [which is a recipe written in French and is translated into English by machine at our end (the enclosed copy has the translator's handwritten memos for your reference)] Publication Date: Jan. 17, 2014.

(Continued)

*Primary Examiner* — Janice Y Silverman
(74) *Attorney, Agent, or Firm* — Amster, Rothstein & Ebenstein LLP

(57) ABSTRACT

The present invention relates to an industrial process for continuously or industrially producing a food based on inverse laminated dough and also to the food products prepared according to this process.

12 Claims, 6 Drawing Sheets

(56) References Cited

OTHER PUBLICATIONS

European Office Action Issued on Jan. 29, 2026 With Respect to Counterpart European Patent Application No. 21729397.6, 15 pages.
Swissbake Innovative Baking Solutions, G/10 Parel Shivsmruti CHS, "What are Flour Types T45, T55, T65, T150, Type 0 or Type 00, Magic Enzy Flour, Rye Flour T1150, Pizza Flour?", Mar. 21, 2017 (Mar. 21, 2017), 15 pages, "posted by Chef Joseph".

* cited by examiner

T1 T2 T3

Figure 4A (T4)
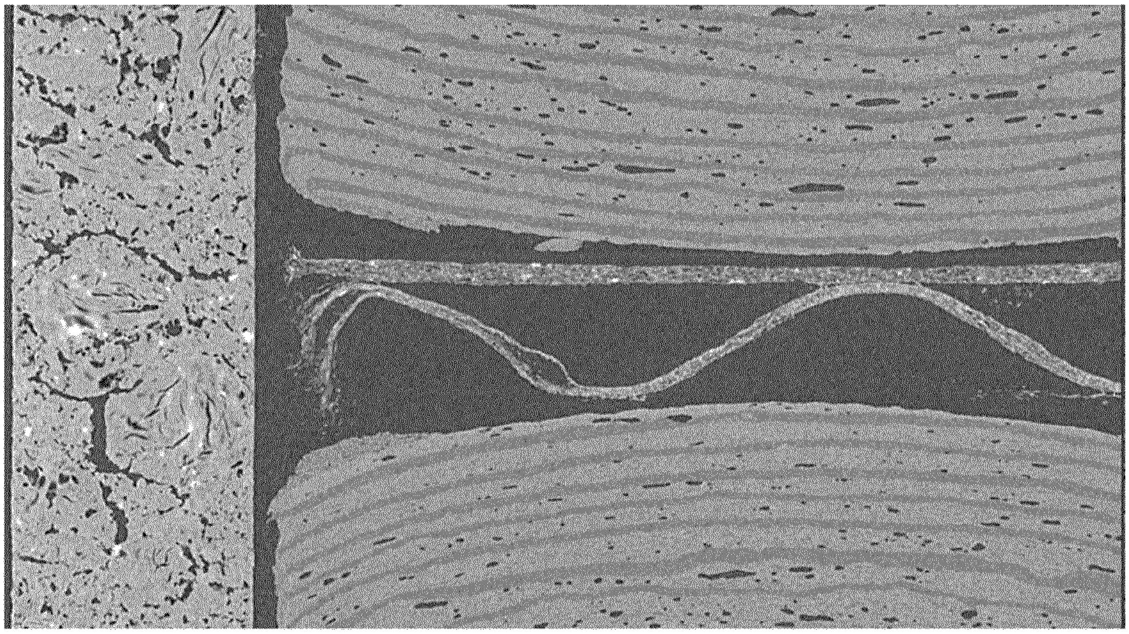
Figure 4B (T5)
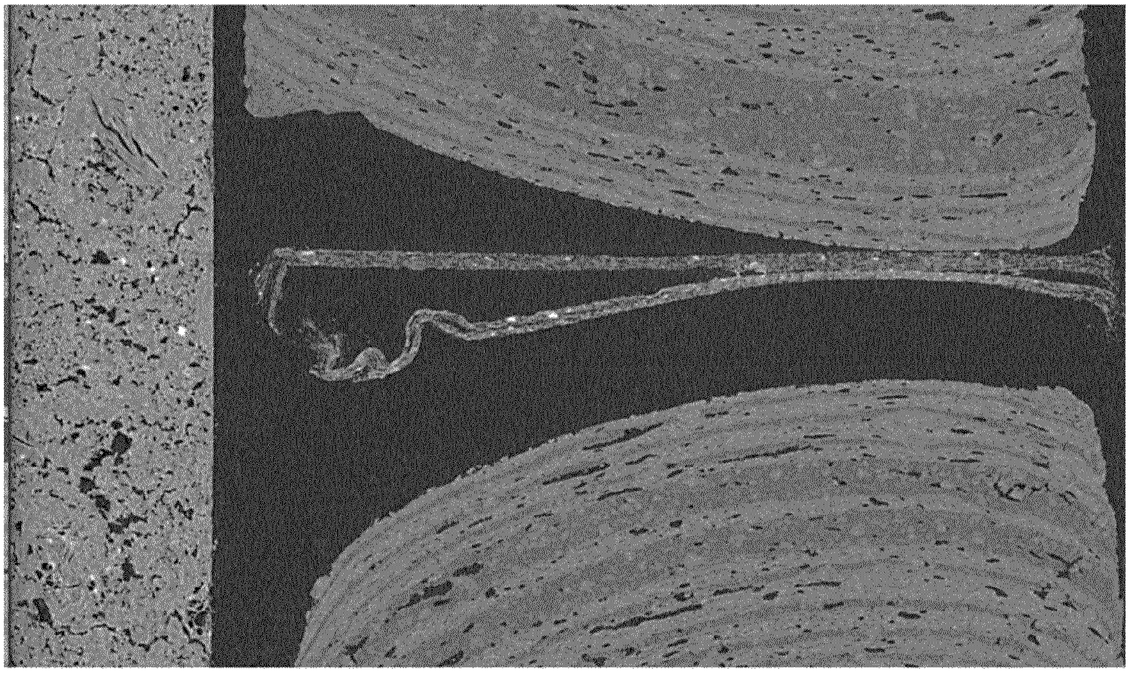

Figure 5A (T4)
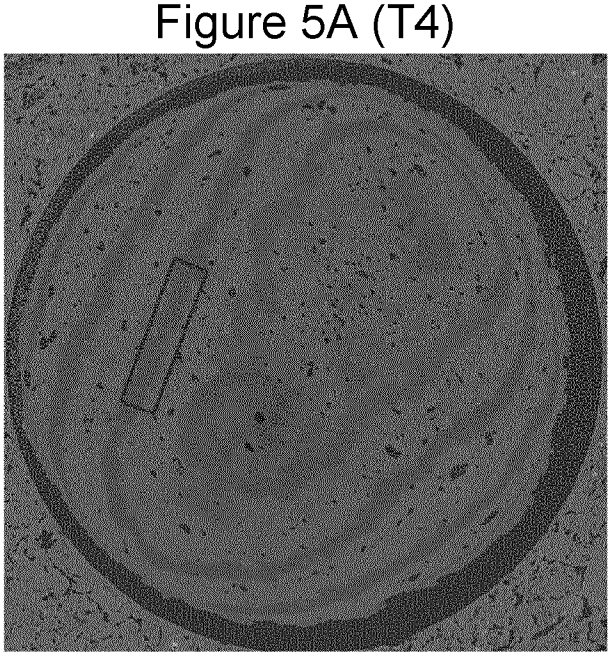
Figure 5B (T5)
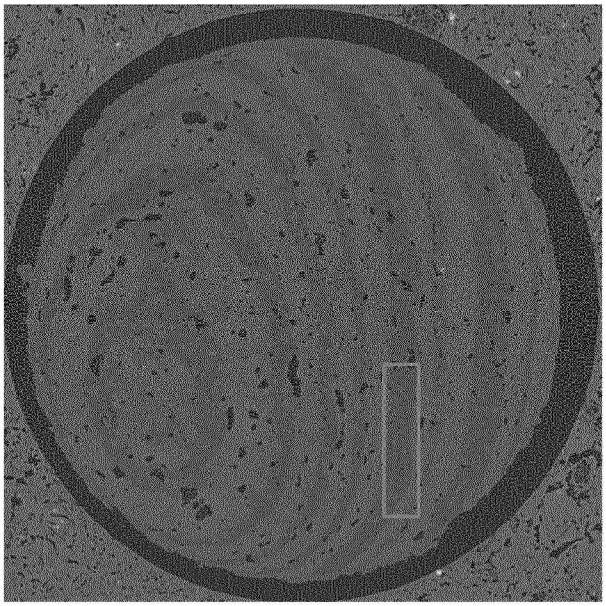

T6 T7 T8

INDUSTRIAL PROCESS FOR CONTINUOUS PRODUCTION OF INVERSED LAMINATED DOUGH

CROSS-REFERENCE TO RELATED APPLICATIONS

This application is a U.S. national stage entry under 35 U.S.C. § 371 of PCT International Patent Application No. PCT/EP2021/065805, filed Jun. 11, 2021, which claims priority to French Patent Application No. 2006104, filed Jun. 11, 2020, the contents of each of which are incorporated herein by reference in their entirety.

TECHNICAL FIELD

The present invention relates to an industrial process for continuous production of inversed laminated dough, the dough products obtained thereby, and the food products based on such dough, such as pastry products.

BACKGROUND

Pastry products are produced from multi-layered laminated dough systems. Typically, a pre-dough composition is prepared by mixing and kneading all ingredients together in a single step. The pre-dough is then sheeted, and a fat layer is enclosed within a bottom and top layer of the pre-dough. Repeated sheeting and folding of this layered paste produces a laminar system with alternating sheets of pre-dough and fat. This is the standard process to obtain pastry products. In an industrial bakery the fat for making pastry dough (i.e. the lamination fat, which can comprise butter, margarine or blends thereof) is received in the shape of blocks (10 to 25 kg blocks). From these blocks, a regular and continuous layer of fat is created by using a so-called fat pump. This fat layer then follows the different sheeting and laminating steps in the process. Lamination fat is a water in oil emulsion. In case the water contained in the lamination fat is not finely and correctly distributed this can lead to water expulsion during the lamination fat extrusion. Said expulsed water leads to stickiness and as such, creates quality issues and/or blocks the production line.

Reversed (puff) pastry, inverted pastry or inverse (puff) pastry (in French 'Feuilletage inversé') is already used in a few French artisan bakeries to produce puff pastry-based products like "mille-feuilles" and "galettes des rois". In the last years some premium bakeries in France started using this process to make yeast-raised pastry products like croissants. The base principle is the same as in a standard pastry process: a multi-layered pastry dough system with alternating layers of fat and pre-dough. The reversed pastry method, as indicated by the name, however starts with a pre-dough layer between two fat layers (i.e. the fat is at the external side). After this first step, also a multitude of sheeting and folding steps are used in the reversed pastry process to create a multi-layered pastry dough. Another difference with the standard pastry process is the introduction of flour in the fat layer for the reversed pastry process. The fat mixed with flour is called kneaded butter ("beurre manié" in French) and is prepared in advance in a planetary mixer using a "leaf" device. The artisanal bakers are currently using standard flour in kneaded butter (often the same flour than in the pre-dough). The aim of the flour contained in kneaded butter is to limit stickiness in the later stages of the process. To get a correct layering the artisan baker pays attention at each step of the process on the lamination table particularly at the first reduction step in order to keep a correct alternation of pre-dough layers and fat layers. The artisan baker can adjust the reduction steps and possibly add manually dusting flour when the layer of fat is starting to stick. Experienced bakers can also manually correct the cracks at the side by moving the piece of kneaded butter by hands. Resting times between the reduction steps are also commonly applied to cool down and relax the layers to avoid defects in the layers. This process of reversed pastry is well known by premium professional artisan bakers to give end products that are more regular, crispier, have a shorter bite and/or a more melt in the mouth texture (are more 'fondant').

This artisan process of making reversed pastry is however a very laborious job and cannot be simply extrapolated to an (semi-) industrial, continuous production process. Indeed, the reversed pastry multi-layered dough is much more sensitive to handle than a standard pastry dough and as such, generates a lot of issues on an industrial line (stickiness, line blockages etc).

Since the fat layers are at the external side of the reversed pastry multi-layered dough, the main issue when handling such dough is the very sticky behaviour. A sticky dough will create fouling on the equipment used to reduce the multi-layered dough thickness (reduction). When the multi-layered dough sticks to the equipment, it will quickly accumulate and block the complete production line. Furthermore, this dough accumulation will even at low levels already damage the quality of the multi-layered dough system and as such, impact the quality of the end products (lack of layering).

The external layer of fat needs to be plastic enough to follow all reduction and folding steps without cracks and without sticking. Avoiding stickiness or cracks in the fat layer is of utmost importance for the end quality of the pastry.

The present invention intends to solve this by introducing a number of innovative and specific changes into the standard (batch/artisanal) production process of producing laminated dough that make it suitable for producing inversed laminated dough in a continuous manner on an industrial scale (substantially without manual intervention/adjustments on the production line).

SUMMARY OF THE INVENTION

One of the objectives of the present invention is to offer an industrial process for continuous production of inverse laminated dough and products derived therefrom such as galettes, sheets, croissants, or other food products based on leavened dough, leavened Danish pastry dough or puff pastry dough products that are more regular, crispier, have a shorter bite and/or a more melt in the mouth texture (are more 'fondant').

After numerous lab and industrial trials, the present inventors were able to find a solution for the "stickiness" problem and have identified a combination of special functional ingredients, adapted equipment and specific process parameters, the new process as indicated herein reduces the stickiness of the fat-dough-fat layered product, making it easier to handle through an industrial or continuous process (substantially without manual intervention on the production line) and resulting in the production of high-quality multi-layered pastry dough such as leavened or non-leavened pastry dough, Danish pastry dough or puff pastry dough.

Thus, the present invention provides for the following aspects:

Aspect 1. An industrial and continuous process for producing reversed laminated pastry dough comprising the steps of:

i) Preparing a laminating fat composition comprising: a fat component and from 0.1 to 40 wt. % of a functional ingredient increasing the water and fat binding capacity and viscosity of the laminating fat;

ii) Preparing a dough premix (pre-dough) composition comprising between 40 and 70 wt. % water on flour, and kneading said premix into a dough;

iii) Feeding of the laminating fat and pre-dough mixture in separate extruders;

iv) Extruding the fat and pre-dough to obtain superimposed sheets of fat, dough and fat; resulting in sheet of pre-dough in between 2 sheets of laminating fat composition;

v) Reduction of the fat-dough-fat sheet by means of one or more calibrators, optionally by adding flour at the bottom of the fat-dough-fat sheet by means of a flouring device located before and/or after each one or more calibrator;

vi) Folding the fat-dough-fat sheet multiple times to obtain a reversed multilayer laminated dough;

vii) Optionally allowing the reversed multilayer laminated dough to rest at a temperature of between 0 and 15° C. for at least 30 minutes to up to 24 hours;

viii) Reducing the reversed multilayer laminated dough into sheets of between 40 mm to 2 mm, preferably to below 10 mm, such as to 5 mm or lower, by means of one or more calibrators;

wherein during all steps the reversed multilayer dough temperature is kept at a temperature of between 0 and 20° C., preferably of between 1 and 15° C., such as of between 2 and 10° C.

The inventors have found that the use of an adequate number of calibrators and adjusted process parameters results in the avoidance of tearing of the layers and preserves the gluten network formed in the dough. Calibrators also avoid applying too much pressure on the dough resulting in water excretion, which would result in stickiness of the reversed laminated dough on the line, and can lead to cracks or tears in the dough, uneven lamination and blocking of the production line.

Also the use of specific types of flour for the pre-mix and of a functional ingredient in the fat laminating component is important.

Ideally, the rheology of the dough pre-mix and the laminating fat is similar enough such that both can be easily extruded at the same speed and form a continuous fat-pre-dough-fat sandwich or sheet.

Aspect 2. The process according to aspect 1, wherein said functionalised ingredient to be mixed into the laminating fat composition can have one or more the following characteristics:

a) an adequate water holding capacity as measured by centrifugation (AACC 88-04). The standard method AACC N° 88-04 enables to measure the water retention capacity of partially soluble particles. This is done in absence of excess water at a centrifugation speed of 2000 g, for 10 minutes as reported in Quinn and Paton 1979 (A practical measurement of water hydration capacity of protein materials, Cereal Chem. 56 (1) (1979) 38-40). Typically, the functional ingredient has a water holding capacity of equal to greater than 0.8, preferably equal to or greater than 0.84, more preferably equal to or greater than 0.85 such as between 0.84 and 1, preferably higher than 0.85; and/or b) an adequate degree of gelatinisation of the starch (if present in said fat composition). Preferably said degree of gelatinization of the starch is at least 5%, such as between 9 and 15%, such as between 10 and 14%, such as between 11 and 15%, or between 12 and 14% when it is present in an amount of between 10 and 35%, such as between 15 and 30%, such as between 20 and 25% on the total weight of the fat composition. It will be understood that depending on the degree of gelatinization of the starch used, the amount of functional ingredient can vary accordingly to achieve the same technical effect. The skilled person will be able to calculate the corresponding adequate amount of a starch or wheat flour with different degrees of gelatinization.

In preferred embodiments, said functional ingredient can be selected from: pre-gelatinized starch or wheat flour such as heat treated pre gelatinized wheat flour, hydrocolloids and fibers such as dietary fibers selected from: non-starch polysaccharides and other plant components such as cellulose, resistant starch, resistant dextrins, inulin, lignins, chitins, pectins, beta-glucans, and oligosaccharides.

Aspect 3. The process according to aspect 1 or 2, wherein the flour is selected from wheat, or blend comprising wheat flour, rye flour, spelt flour, durum flour, or whole meal.

The flour used for the dough premix preferably can have any one or more of the following characteristics:

a) An adequate water absorption: One of the major specificities of reverse pastry being that the steam, needed for the development of pastry during cooking, is generated both by the free water contained in the fat, and by the free water of the dough. At the same time, some water is often released from the dough through the lamination process, which is a real issue for the continuous industrial production on an industrial scale of inversed laminated dough. Advantageously, said flour has a water absorption of equal to or greater than 40, preferably equal to or greater than 45, 50, or 55, more preferably between 40 and 70, such as between 50 and 65, or between 45 and 65. Water absorption can be measured with a standard farinograph (e.g. of Brabender), adapted from AACC 54-21.02 (https://methods.aaccnet.org/summaries/54-21-02.aspx), water at 30° C. e.g. as specified in the Brabender farinograph manual (https://www.brabender.com/typo3conf/ext/cokcb2web/Resources/Publ s/files.php?d=1 &p=TURrd2pieE9RMU16eIIUVVILTXIETmIORXhPR2xNVFVORGs9X01UWXhPMip5.pdf);

b) the ratio between tenacity and extensibility of the flour can be expressed by the P/L ratio as measured by an alveograph (e.g. Chopin). Preferably said dough or flour has a P/L of below 1.2. In view of the use in the current invention it is important to have a flour with both a higher water absorption value and a P/L value of below 1.2, preferably below 1.1, more preferably below 1.

Alternatively, specific rheological properties of consistency and elasticity assessed by the BIPEA panification test (calibrated, standard NF V 03-716 of December 2015). Typically, a consistency in excess of equal to or higher than 7 and/or elasticity in excess equal to or higher than 4, preferably 7;

and/or c) the flour used in the dough pre-mix can in some preferred embodiments have a high protein content such as a protein content of 10% or more, such as 11% or more, more preferably of 12% or more, such as from 10 to 20% protein, preferably of 12 to 17% of protein.

Aspect 4. The process according to any one of aspects 1 to 3, which is performed on a semi-industrial or industrial scale, substantially without human manipulation on dough level, i.e. once the production line is active, substantially no human manipulation is needed.

Aspect 5. The process according to any one of aspects 1 to 4, wherein the fat composition represents between 12 and 40 wt. % of the final reversed multilayer laminated dough composition.

Aspect 6. The process according to any one of aspects 1 to 5, wherein said dough premix further comprises one or more components selected from: sugar, gluten, improver, salt, yeast, sourdough, eggs and dairy ingredients such as milk, milk powder, buttermilk, whey.

Aspect 7. The process according to any one of aspects 1 to 6, further comprising a step of proofing or pre-proofing of the reversed multilayer laminated dough.

Aspect 8. The process according to any one of aspects 1 to 7, further comprising a step of freezing the reversed multilayer laminated dough.

Aspect 9. The process according to any one of aspects 1 to 8, wherein said fat composition of step i) is prepared prior to the process of claim 1 and optionally stored at a temperature of maximum 15° C., such as of between 0 and 10° C., preferably of between 2 and 8° C., for a period of minimum 30 minutes to up to 2 days or several weeks.

Aspect 10. An industrial production line for continuously producing reversed laminated dough comprising the following elements:

- one or two butter or fat pumps located at the start of the production line, each comprising: a first feeding means for adding fat to the pump; one or more horizontal and one or more vertical screws for malaxating the fat; a second feeding means for continuously adding in a homogeneous manner a functional ingredient to said fat, said second feeding means being located after the feeding means for the fat; and an extrusion means configured to uniformly form a sheet of butter or fat;
- one or more dough extruder(s) located at the start of the production configured to uniformly form a sheet of dough;
- said butter or fat pumps and dough extruder being configured so as to form a continuous sheet of reversed laminated dough comprising a sheet of dough comprised between two sheets of butter or fat, thereby forming a reversed (or inverse) laminated dough sheet;
- one or more conveyor belts configured to continuously transport the sheet of reversed laminated dough at a speed matching that of the extruder and fat pumps;
- one or more flouring units located downstream of the butter pumps and dough extruder configured for providing flour on the reversed laminated dough;
- one or more calibrators for stretching and reducing the obtained reversed laminated dough sheet;
- a folding means configured to fold the reversed laminated dough sheet several times, thereby forming a multiple layer reversed laminated dough sheet;
- one or more calibrators for stretching and reducing the obtained multiple layer reversed laminated dough sheet; optionally one or more flouring units located upstream of certain or all calibrators for providing flour on the reversed laminated dough;
- one or more brushes to remove excess flour from said reversed laminated dough at the end of the production line.
- In one embodiment, the reversed multilayer dough temperature is kept at a temperature of between 0 and 20° C., preferably of between 1 and 15° C., such as of between 5 and 15° C., either through refrigeration of the different components of the production line or by working in a sufficiently refrigerated area. Typically the extruders, pumps and mixers in said production line can be refrigerated in order to avoid temperature increase in the product caused by shearing.

Aspect 11. The production line according to aspect 10, further comprising cutting, rolling and/or shaping means configured to prepare the final form or shape of the dough product or sheet, suitable for packaging and/or storage or (deep) freezing.

Aspect 12. The production line according to aspect 10 or 11, additionally comprising one or more resting zones to allow the dough to relax between different processing steps and thereby avoiding damage to the gluten network.

Aspect 13. The production line according to any one of aspects 10 to 12, which is an industrial production line, requiring substantially no human intervention on the line during the production.

Aspect 14. The use of the production line according to any one of aspects 10 to 13 for producing raw reversed laminated dough food products such as reversed (or inverse) pastry or puff pastry dough products and sheets, Danish pastry products, Flaky pastry, Jachnun, Kubaneh, millefeuilles, galette des Rois, Viennese pastry, croissants, chocolate rolls, turnovers or galettes.

Aspect 15. Raw or pre-proved reversed laminated dough food products such as reversed (or inverse) pastry or puff pastry dough products and sheets, Danish pastry products, Flaky pastry, Jachnun, Kubaneh, millefeuilles, galette des Rois, Viennese pastry, croissants, chocolate rolls, turnovers or galettes obtained by the method according to any one of aspects 1 to 9.

Aspect 16. Process according to anyone of aspects 1 to 9, wherein the final laminated dough product is frozen at a temperature of between −12° C. and −30° C., preferably for a period of between 20 minutes and 24 hours.

Aspect 17. Process according to anyone of aspects 1 to 9, wherein the final laminated dough product is deep frozen (shock-frozen) at a temperature of between −18° C. and −40° C., preferably for a period of between 2 minutes and 1 hour.

Aspect 18. Process according to anyone of aspects 1 to 9, wherein the final laminated dough product is frozen through a freezing step carried out at a temperature of between −12° C. and −18° C., preferably for a period of between 20 minutes and 24 hours, followed by a deep-freezing step carried out at a temperature of between −18° C. and −40° C., preferably for a period of between 2 minutes and 1 hour, or vice versa. In one embodiments, the final laminated dough product is frozen through a freezing step carried out at a temperature of between −18° C. to −40° C., preferably for a period of between 20 minutes and 24 hours.

Aspect 19. Process according to anyone of aspects 1 to 9 or 16 to 18, additionally encompassing a baking step of the frozen product, preferably in an oven which is a conventional oven or a pulsed air oven, with or without steam.

Aspect 20. Process according to aspect 19, in which said baking step is carried out at a temperature ranging from 140 to 200° C., preferably for a period ranging from 12 to 30 minutes.

Aspect 21. Process according to aspect 19 or 20, wherein prior to the baking step, a step of proofing or pre-proofing or of glazing or egg-washing is performed on the dough product.

BRIEF DESCRIPTION OF THE DRAWINGS

FIG. 4. X ray analysis of a cylindrical core (side view of the core) from a frozen raw croissant, made in a standard manner (T4=non-inversed laminated dough) and made according to the method of the invention (T5), The dough is seen as light grey and the fat is seen as dark grey. It is clear that in the fat layers of T5 croissants, the functional powder can clearly be visualized as lighter spots within the darker fat layer.

FIG. 5. X ray analysis as in FIG. 4, at 15 mm 1000× magnification (horizontal slice of the core). Again, in the fat layers of T5 croissants, the functional powder can clearly be visualized as lighter spots within the darker fat layer.

DETAILED DESCRIPTION

Figure 1:
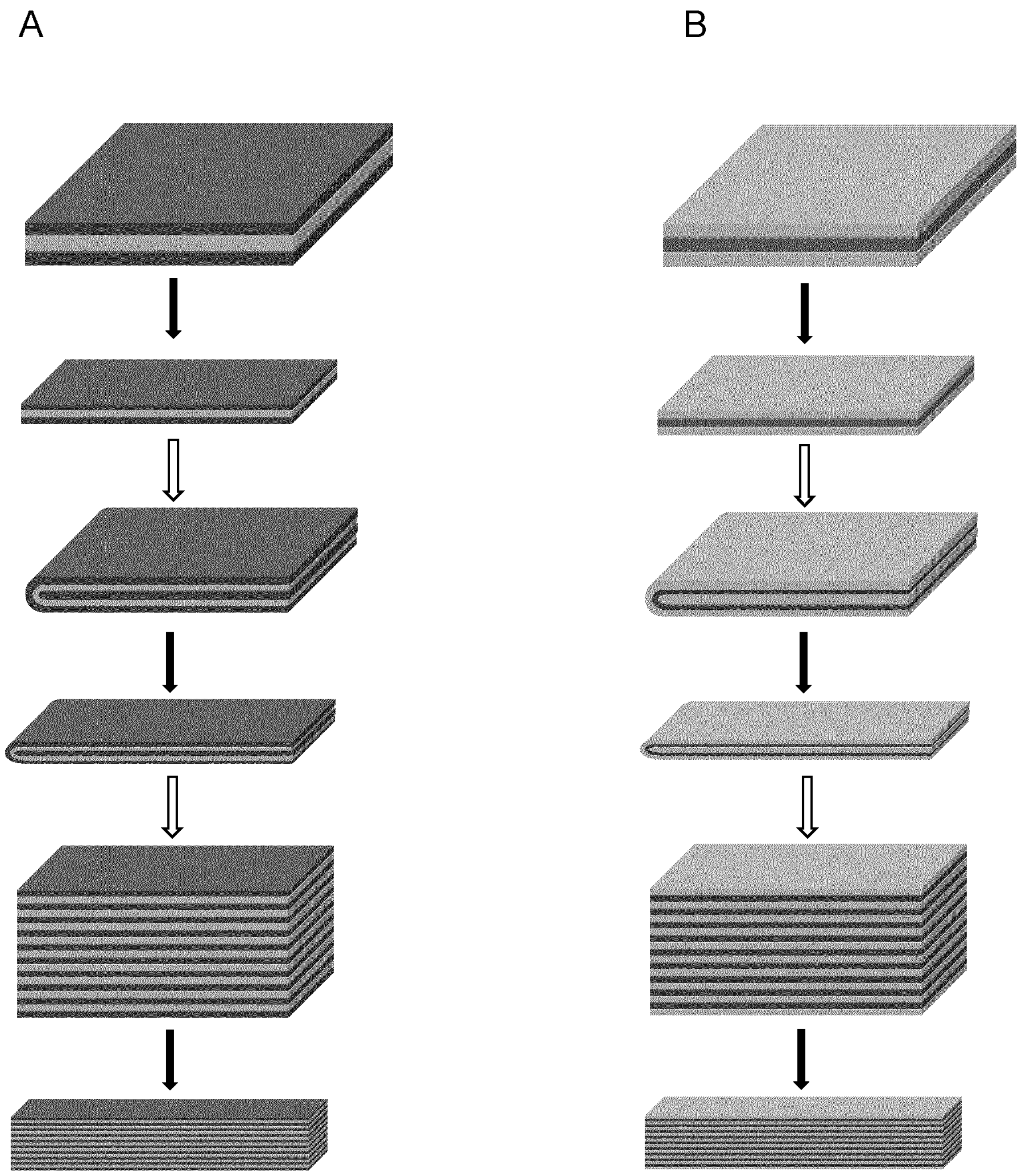
FIG. 1. Schematic comparison of traditional laminated dough (A) versus inverse laminated dough (B) and of laminating process. Dark arrows represent sheeting or reduction steps, white arrows represent folding steps. Said steps are repeated to obtain a multi-layered product. Light grey sheets represent laminating fat (A) or laminating fat with functional ingredient (B), dark grey sheets represent dough. It is clear that in (A) the fat layer is sandwiched between two dough sheets or layers, while in (B) the dough sheet is sandwiched between two fat layers. In (A), the dough is at the outside of the multilayer laminated dough, while in (B) the fat layer is at the outside of the final product, i.e. the reversed multilayer laminated dough.

The present invention will be described with respect to particular embodiments but the invention is only to be seen as limited by the claims. Any reference signs in the claims shall not be construed as limiting the scope. The following terms or definitions are provided solely to aid in the understanding of the invention. Unless specifically defined herein, all terms used herein have the same meaning as they would have to one skilled in the art of the present invention. The definitions provided herein should not be construed to have a scope less than the one understood by a person of ordinary skill in the art.

Unless indicated otherwise, all methods, steps, techniques and manipulations that are not specifically described in detail can be performed and have been performed in a manner known per se, as will be clear to the skilled person. Reference is for example again made to the standard handbooks, to the general background art referred to above and to the further references cited therein.

As used herein, the singular forms ‘a’, ‘an’, and ‘the’ include both singular and plural referents unless the context clearly dictates otherwise. The term “any” when used in relation to aspects, claims or embodiments as used herein refers to any single one (i.e. anyone) as well as to all combinations of said aspects, claims or embodiments referred to.

The terms ‘comprising’, ‘comprises’ and ‘comprised of’ as used herein are synonymous with ‘including’, ‘includes’ or ‘containing’, ‘contains’, and are inclusive or open-ended and do not exclude additional, non-recited members, elements or method steps. Said terms also encompass the embodiments “consisting essentially of” and “consisting of”.

The recitation of numerical ranges by endpoints includes all numbers and fractions subsumed within the respective ranges, as well as the recited endpoints.

The term ‘about’ as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier ‘about’ refers is itself also specifically, and preferably, disclosed.

All references cited in the present disclosure are hereby explicitly incorporated by reference.

For the purposes of the invention, the term “laminating fat” as used herein encompasses any type of dairy based butter or margarine (animal fat or vegetable oil based) or blends thereof that is suitable for laminating dough. Suitable laminating fats need to have a tough and plastic texture as it is required to be rolled out, stretched and sheeted onto the dough layer. This step may be carried out on an automatic system with an extruder by forming a laminate structure comprising superimposed layers of fat and of dough. In all cases, the laminating fat used herein is mixed with a functional ingredient as defined herein to obtain a laminating fat composition. It needs to have a melting point that enables to keep the dough layers apart during proofing and initial baking. Such a functional ingredient can be present in an amount of between 0.1 and 40%, such as between 15 and 30%, such as between 20 and 25% on the total weight of the laminating fat composition.

The amount of butter or of margarine or blend thereof incorporated into the final dough can be representing between 15% and 40%, such as between 20% and 30% by weight of the total weight of the dough. The layers of fat allow the product to develop, carbon dioxide exerting a pressure between the layers. The fat layer on the outside of the laminated dough can result in an additional crustiness or flakiness of the product upon baking.

The term “pre-gelatinized” when used in combination with flours such as wheat flour or starch indicate flours that have been heated to a certain extent such as to contain a certain degree of gelatinized starch, such as between 9 and 15%, such as between 10 and 14%, such as between 11 and 13%, such as about 12%.

For the purposes of the invention, the term "dough premix" or "pre-dough" as used herein encompasses a mixture comprising flour and water and optionally other ingredients such as, but not limited to: sugar, gluten, improver, salt, yeast, sourdough, eggs and dairy ingredients such as milk, milk powder, buttermilk, or whey.

The term "improver" encompasses active compounds which assist the development of the dough and shelf-life of the product. Non-limiting examples are: enzymes, emulsifiers or ascorbic acid.

For the purposes of the invention, the term "reduction" as used herein encompasses the reduction of the thickness of the laminated dough sheet, typically done by means of a calibrator, or sheeter. After folding, the laminated dough can easily have a thickness of 4 to 7 cm and in order to be useable in e.g. puff pastry products, its thickness needs to be reduced to about 5 mm, or even less before shaping. This can be done using a series of calibrators with reduced openings, hence resulting in a series of reductions of the laminated dough in a gentle manner, i.e. without causing the gluten network and/or the fat layers to break or rupture.

For the purposes of the invention, the terms "reversed", "inverse", or "inverted" when used with relation to (laminated) dough or (puff) pastry" as used herein encompasses a multilayered ((puff) pastry) dough product starting from a layer of dough that has been sandwiched between two layers of fat and refers to the French term 'Feuilletage inverse'.

For the purposes of the invention, the terms "industrial" or "semi industrial" as used herein encompasses any continuous process not or barely requiring manual manipulation of the dough, i.e. a system that is substantially fully autonomously producing the inversed multilayer laminated dough products or sheets. This is in contrast to artisan processes, which require the interaction (manual manipulation/adaptations) of a (artisanal) baker in order to complete the production phase of the dough.

For the purposes of the invention, the term "extruder" as used herein encompasses any extrusion means that enables the production of a thin layer or sheet of either dough, fat or butter. It will typically comprise a thin opening or "mouth" through which the dough, fat or butter is forced out of the pump onto the conveyor belt or onto another layer. For example, a combination of three extruders can be used to create a sandwich of fat-dough-fat sheets according to the invention. In some embodiments, said extruder comprises a feeding means for the dough premix; one or more vertical and/or horizontal screws and an extrusion means.

For the purposes of the invention, the terms "fat pump" or "butter pump" as used herein encompasses any type of pump capable of sufficiently malleating the fat or butter so as to make it plastic enough for thin sheeting by means of an extruder.

For the purposes of the invention, the term "flouring device" or flour "duster" as used herein encompasses any means that can dust or bring a thin layer of flour on and/or under the laminating dough sheet in order to reduce its stickiness during continuous industrial production.

For the purposes of the invention, the term "conveyor belt" as used herein in relation to the production line for producing inversed laminated dough encompasses any conveying system that is able to transfer the sheet of laminated dough over the production line. It can typically comprise multiple separate elements connecting the other means and devices on the line such as extruders, calibrators, laminators or folders, etc. and enabling the transfer of the sheet to said subsequent elements.

For the purposes of the invention, the term "calibrator" as used herein in relation to the production line for producing inversed laminated dough encompasses any reduction means or sheeting means that uses a single roller to reduce the thickness of the dough. This is not to be confused with a multi-roller reduction means.

For the purposes of the invention, the term "folding means" as used herein in relation to the inversed laminating production line refers to a device that can fold and stack the inversed laminated dough sheet one or multiple times. There are different types of folding means, sometimes also referred to as "laminators", that result in asymmetrical lamination or symmetrical lamination. Lamination can be done in different ways. For example, through lapping, which is done by running the dough sheet vertically between a guiding system that moves back and forth. In cutting and stacking, a guillotine cuts the dough sheet into regular rectangular sheets which are then stacked on top of each other. Alternatively, laminating can be done through horizontal laminating, whereby the conveyor belt with the dough sheet moves back and forth above the next conveying belt, thereby stacking the layers.

This laminating step may be progressive laminating, the dough passing through one or more calibrators, the space made between the conveying belt and the calibrator decreasing towards the following calibrator. Preferably, at the end of the laminating step, the thickness of the dough is between 15 and 2 mm, and preferably between 10 and 2 mm.

The term "reversed laminated dough" encompasses a dough comprising many thin layers of dough separated by the laminating fat, created by repeated folding and rolling or reduction of the fat-dough-fat sheet. Said folding can lead to anything from 12 to 144 layers.

Non-limiting examples of laminated dough products are: croissant pastry, Danish pastry, Viennese pastry, Flaky pastry, Jachnun, Kubaneh, puff pastry, millefeuilles, or puff pastry sheets for making galettes (in French: "galette des Rois").

During the process of the invention one or more steps of cooling and/or resting of the laminated dough sheet can be introduced resulting in relaxing of the dough and enabling easy handling throughout the subsequent production steps. Said cooling can preferably be carried out until the temperature of the dough is between 0 and 10° C., and preferably comprised between 5 and 10° C. The pre-dough mixture and/or fat composition comprising functional ingredient can be cooled down prior to the extrusion. Particularly the fat composition comprising functional ingredient can be prepared beforehand and cooled prior to feeding into the butter or fat pump. This can be done for a couple of hours to up to several days of storage in a refrigerated storage room.

The process of the invention may comprise a step of rolling, shaping, and/or cutting up the dough. For example, for the preparation of a croissant, the cutting up step is carried out in the shape of a triangle, said croissant then being rolled up on itself to give it the desired shape, sheets for e.g. galettes can be cut out as well.

Cutting up the dough for the preparation of e.g. a chocolate roll or a fruit or pudding filled roll or pastry can also be envisaged of course.

The process of the invention may comprise a proofing step wherein said shaped products can be proofed at a temperature ranging between 15° C. and 35° C., preferably between 25° C. and 30° C.; proofed at an adequate relative humidity ranging between 60% and 90%, preferably between 65% and 80%; and proofed for an adequate time ranging between 30 min and 3 hours, preferably between 1.5 hours and 2.5 hours.

During the optional step of freezing and/or deep-freezing the raw food, the temperature is preferably between −12 and −40° C., for a period ranging from 30 minutes to 1 hour. Said food product can be frozen in its cut or shaped form or as a sheet. Said step is carried out, for example, in a freezing or deep-freezing tower. This step makes it possible to store the food for periods of between several hours and several months, and also to maintain the shape of the food product.

Advantageously, the freezing and/or deep-freezing step in continuous production may comprise:

- either a freezing step carried out at a temperature of between −12° C. and −30° C., preferably for a period of between 20 minutes and 24 hours, or
- a deep-freezing (shock-freezing) step carried out at a temperature of between −18° C. and −40° C., preferably for a period of between 2 minutes and 1 hour, In deep-freezing, the core of the product achieves a temperature of −18° C., or
- a freezing step carried out at a temperature of between −12° C. and −30° C., preferably for a period of between 20 minutes and 24 hours, followed by a deep-freezing step carried out at a temperature of between −18° C. and −40° C., preferably for a period of between 2, 3, 4, or 5 minutes and 1 hour, or conversely a deep-freezing step carried out at a temperature of between −18° C. and −40° C., preferably for a period of between 2, 3, 4, or 5 minutes and 1 hour, followed by a freezing step carried out at a temperature of between −12° C. and −30° C., preferably for a period of between 20 minutes and 24 hours.

The process of the invention may also comprise a glazing step, preferably carried out with eggs and or eggs with other ingredients. This glazing may be carried out before or after the freezing and/or deep-freezing step.

In an additional step, preferably in an ulterior phase, the raw, (pre-) proved, or frozen or deep-frozen food product can be baked in an oven. The oven used may be a conventional oven or a pulsed air oven, with or without steam. According to one embodiment, the baking step is carried out at a temperature ranging from 140 to 200° C., preferably for a period ranging from 10 to 30 minutes. After the baking, the baked foods thus prepared are ready to be consumed.

Another object of the invention relates to raw, or frozen or deep-frozen Danish or Viennese pastries or sheets based on leavened dough, puff pastry or puff pastry dough, produced according to the process of the invention, preferably being chosen, among others, from Danish pastry, Viennese pastry, Flaky pastry, Jachnun, Kubaneh, Puff pastry or puff pastry sheets for making galettes (in French: "galette des Rois"). Specific examples of end products are galettes, croissants, chocolate, pudding, cream, fruit, or jam filled pastry and chocolate rolls (pains au chocolat).

Another object of the invention relates to baked foods based on puff pastry or puff pastry dough, produced according to the process of the invention, said foods preferably being chosen, among others, from Danish pastry, Viennese pastry, Flaky pastry, Jachnun, Kubaneh, Puff pastry or puff pastry sheets for making galettes (in French: "galette des Rois"). Specific examples of end products are galettes, croissants, chocolate, pudding, cream, fruit, or jam filled pastry and chocolate rolls (pains au chocolat).

The invention will now be further exemplified in more detail in a non-limiting manner in the examples section.

EXAMPLES

Materials and Methods

Measuring Water Absorption Capacity of the Flour by Farinograph:

Following the AACC International method 54-21.02, the constant flour weight procedure, with water at a temperature of 30° C. (www.aaccnet.org), with a farinograph from e.g. Brabender (Farinograph E) following the instructions from the manufacturer. The principle is as follows: water and flour are mixed into a dough, developed and finally overmixed; water is added to a content to obtain a standard consistency of 500 Brabender Units (B.U.) and the water absorption can be analysed following the AACC 54-21.02 method.

Measuring Dough Extension Capacity Through an Alveograph

An Alveograph (e.g. from Chopin) is used to measure the dough extension capacity. The principle is as follows: the Alveograph measures the resistance of a dough against extension and the extent to which it can be stretched. A sheet of dough is expanded by air pressure into a bubble until it is ruptured and the internal pressure in the dough bubble is graphically recorded on paper.

P is the maximum pressure, roughly equaling the resistance of the dough against extension (tenacity)

L is the average length of the curve a rupture of the bubble roughly equaling the dough extensibility P/L is the balance between tenacity and extensibility of the dough W: surface under the curve; measure for the flour strength. The higher the protein content of flour, the higher W and better baking quality (more volume) if kneading and water absorption are sufficient.

Water Holding Capacity of the Fat Composition

The functional ingredient to be added to the fat component needs to have a sufficiently high water holding capacity and can be measured by centrifugation according to standard AACC 88-04. Said standard method AACC N° 88-04 enables to measure the water retention capacity of partially soluble particles. This is done in absence of excess water at a centrifugation speed of 2000 g, for 10 minutes as reported in Quinn and Paton 1979 (A practical measurement of water hydration capacity of protein materials, Cereal Chem. 56 (1) (1979) 38-40).

Degree of Gelatinization of the Functional Ingredient

The functional ingredient to be added to the fat component needs to have an adequate degree of gelatinisation of the starch when present. This can be measured by the DSC method:

Sample Preparation:

7 mg of sample was weighed and 21 μL of water was added into the capsule. Capsules were sealed and let to rest for 1 h30 minutes at room temperature prior to analysis.

Analysis:

Temperature was raised from 25° C. to 120° C., at a rate of 3° C./min under nitrogen.

The reference was an empty capsule.

First, the enthalpy of the control sample is determined and then that of the pregelatinized sample, the ratio of both samples gives you an indication of the degree of gelatinization.

Rheological Properties of Consistency and Elasticity of the Flour/Dough

This can be assessed by the BIPEA panification test (calibrated, standard NF V 03-716 of December 2015).

Example 1. A Process According to the Invention for Producing Inverse Laminated Dough Pre-Dough Preparation The recipe for the croissant doughs shown in FIG. 2 was as follows:

| | Typical recipe given on 100 flour |
|---|---|
| Flour | 100 |
| Water | 50 |
| Sugar | 15 |
| Yeast | 7 |
| Salt | 2.2 |
| Improver | 2 |
| Laminating fat | 6.25 |
| TOTAL PREDOUGH | 182.45 |

The dough was produced by kneading: 5' (speed 1)+10' (speed 2)

Functional Ingredient and Fat Compositions

Different amounts of pre-gelatinized starch powder having a degree of gelatinization of about 13.6% as measured according to the differential scanning calorimetry (DSC) method above, was added to butter comprising 16% water:

T1: 25% functional ingredient in the fat component,

T2: 12.5% functional ingredient in the fat component,

T3: 0% functional ingredient in the fat component.

Test Results:

The rheological properties of the dough and the water absorption and dough extension capacity of the flour used in this example were measured according to the methods defined herein and the results depicted below:

| | | |
|---|---|---|
| | Proteins (%) | 14.8 |
| Farinograph | Water Absorption (%) | 65 |
| Alveograph | P (tenacity) | 100 |
| | L (extensibility) | 108 |
| | G | 23.1 |
| | W (baking strength) | 314 |
| | P/L | 0.93 |
| | I.e. (elasticity index) | 53.8 |
| BIPEA | Excess consistency | 7 |
| | Excess elasticity | 7 |
| DSC | Degree of gelatinization | 13.6% |

Inverse Lamination

The inverse lamination process as in aspect 1 was followed in order to obtain inversed laminated dough:

i) Preparing the laminating fat composition comprising said fat component and the functional ingredient, preferably while avoid increase in temperature during preparation;

ii) Preparing a dough premix (pre-dough) composition as indicated above and kneading said premix into a dough;

iii) Feeding of the laminating fat and pre-dough mixture in separate extruders;

iv) Extruding the fat and pre-dough to obtain superimposed sheets of fat, dough and fat; resulting in sheet of pre-dough in between 2 sheets of laminating fat composition, preferably while avoid increase in temperature during extrusion.

v) Reduction of the fat-dough-fat sheet by means of one or more calibrators, optionally by adding flour at the bottom of the fat-dough-fat sheet by means of a flouring device located before and/or after each one or more calibrator;

vi) Folding the fat-dough-fat sheet multiple times to obtain a reversed multilayer laminated dough;

vii) Reducing the reversed multilayer laminated dough into sheets of about 5 mm, by means of one or more calibrators, preferably during said step, the dough is maintained at a temperature of between about 1 and 20° C., such as between about 5 and 15° C.;

During all steps the dough temperature is kept at a temperature of between 1 and 20° C., preferably at a temperature of between about 5 and 15° C.

Cutting, Shaping, and/or Freezing

The inversed laminated dough sheets were industrially (continuous process) cut in triangular pieces and rolled as from the basis of the triangle to form a croissant shaped dough product. These products can be stored or frozen if needed, or can be directly baked.

In this experiment, croissants were frozen, proven and then baked. Baking was done at a temperature ranging of about 180° C. for a period of 13 minutes.

Results

Figure 2:
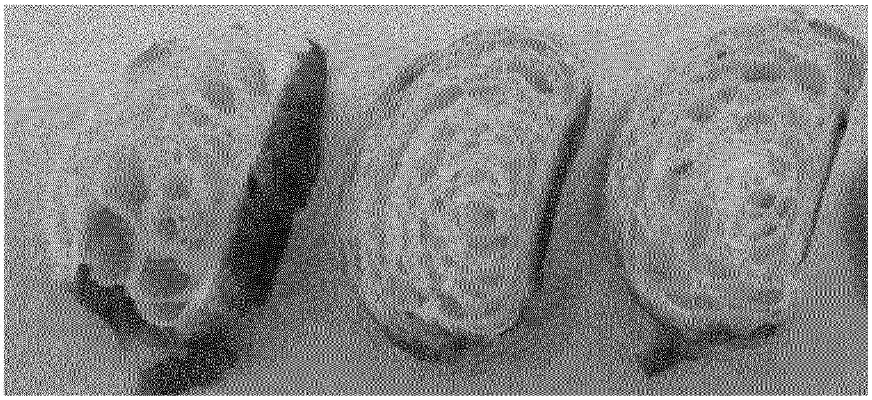
FIG. 2. Effect of adding functional ingredient to fat component in volume development of croissants. Cross sections of baked croissants with variable amounts of functional ingredient: T1: 25% functional ingredient based on 13.6% pre-gelatinized flour in the fat component, T2: 12.5% functional ingredient based on 13.6% pre-gelatinized flour in the fat component, T3: 0% functional ingredient based on 13.6% pre-gelatinized flour in the fat component.

In FIG. 2, the effect of adding functional ingredient to the fat component on volume development of croissants. Cross sections of baked croissants with variable amounts of functional ingredient are shown: T1: 25% functional ingredient in the fat component, T2: 12.5% functional ingredient in the fat component, T3: 0% functional ingredient in the fat component.

As shown in FIG. 2, adding functional ingredient to the fat component, which is necessary to be able to produce the inverse laminated dough on an industrial scale, i.e. in a continuous process, has a negative effect on the volume development of the croissants. Said functional ingredient is however needed to enable the possibility to produce the inverse multilayer laminated dough by means of a continuous process, i.e. substantially without human intervention. This balance between adding functional ingredient to allow continuous production and the reduction in volume development, is very important.

Example 2: Analysis of Croissants Obtained by the Method of the Invention Versus Standard Croissants X-Ray Analysis of Raw Dough Products Croissants were produced in a lab-trial, i.e. in a non-continuous manner using either normal laminated dough (non-inversed), or inversed laminated dough comprising the functional ingredient as disclosed herein.

Test 4 (T4) is an artisanal croissant made using the general recipe of Example 1, using standard laminated dough (not-inversed) and without flour added in the fat layer.

Test 5 (T5) is a croissant made using the general recipe of Example 1, i.e. using the inverse laminated dough process. with 25% of the functional ingredient in the fat component to reduce stickiness.

Figure 3:
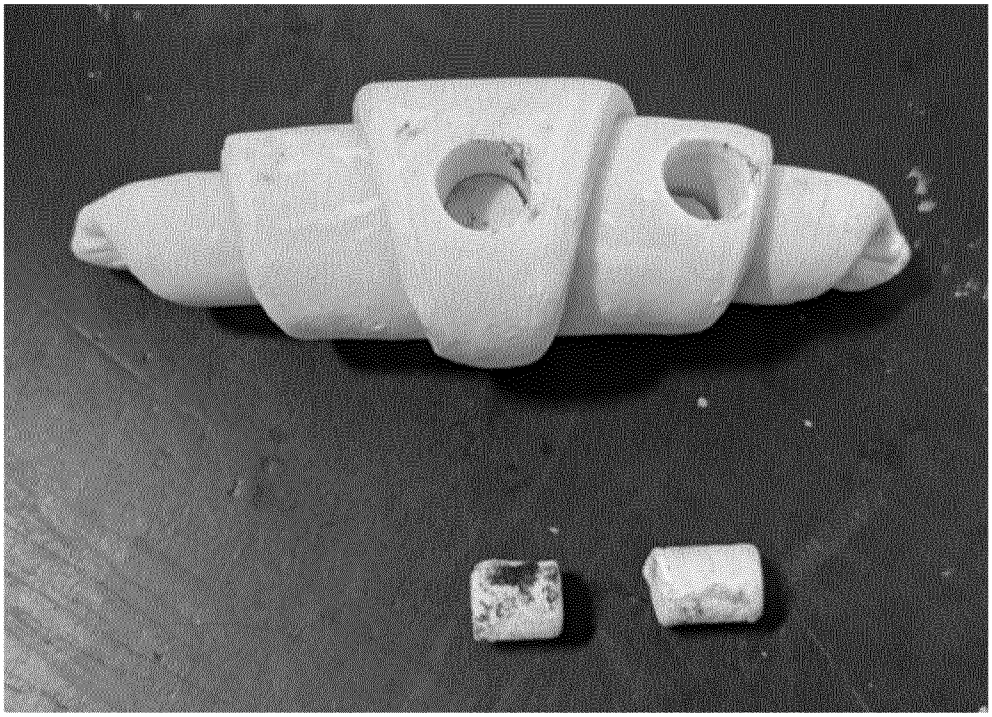
FIG. 3. View of cylindrical core sampling in raw croissant, used for X-ray analysis.

A cylindrical core was sampled from deep-frozen raw croissants and analysed through X-ray analysis (cf. FIG. 3).

As can be seen from FIGS. 4 and 5, the X-ray analysis clearly shows a different structure in the fat layers of the two tested croissants, which hence shows that the raw croissant using said functional ingredient (FIGS. 4B and 5B (T5)) is different and can be distinguished from a raw croissant made e.g. through an artisanal process (FIGS. 4A and 5A (T4)). The dough is seen as light grey and the fat is seen as dark grey. It is clear that in the fat layers of T5 croissants, the functional powder can clearly be visualized as lighter spots within the darker fat layer.

Volume Measurement of Baked Croissants

Croissants were produced in a lab-trial, i.e. in a non-continuous manner using either normal laminated dough (non-inversed), or inversed laminated dough with either standard flour or the functional ingredient (in this experiment gelatinized starch) in order to determine whether or not said functional powder has an effect on volume development of the baked croissants.

Test 6 (T6): is an artisanal croissant made using the general recipe of Example 1, using standard laminated dough (not-inversed—cf. FIG. 1A) and without flour added in the fat layer.

Test 7 (T7): is a croissant made using the general recipe of Example 1, i.e. using the inverse laminated dough process (cf. FIG. 1B). with standard flour in the fat component to reduce stickiness.

Test 8 (T8): is a croissant made using the general recipe of Example 1, i.e. using the inverse laminated dough process (cf. FIG. 1B). with the functional ingredient in the fat component to reduce stickiness.

Figure 6:
FIG. 6. Volume development of baked croissants: artisanal croissant made with: non-inverse laminated dough (T6), inverse laminated dough with standard flour (T7) and inverse laminated dough with functional powder according to one embodiment of the invention (T8). It is clear that the volume decrease that is reached in the T7 croissant by using standard flour in the inverse laminated dough versus a standard croissant (T6) is compensated by using the functional powder in the fat layer (T8).

The volume increase and development of baked croissants (cf. Example 1) was measured and from FIG. 6 it follows that the volume development of the T8 croissants (using functional powder in the inverse laminated dough) has a higher volume than that of T7 (using inversed laminated dough but with standard flour) which can be attributed to the use of the functional powder. When comparing the volume development of the T8 croissants, it is almost as good as that of a standard artisanal croissant (T6), produced with regular laminated dough (non-inversed) (cf. the table below).

| Test no. | Spec. Volume (ml/100 g) | % vs. T6 |
|---|---|---|
| T6 | 466 | 100% |
| T7 | 417 | 89.5% |
| T8 | 450 | 96.6% |

Example 3: Analysis of the Hardness of the Fat Components Used for Lamination The hardness of the fat compositions indicated below was tested using a TA.XT2 texturizer (e.g. Texture Technologies Corp.) according to the instructions of the manufacturer. The samples were kept for 1 night at 8° C.+/−1° C.

| | Flour or Powder | Butter (cubes of 5° C.) |
|---|---|---|
| Butter | 0 | 500 |
| Butter + standard flour | 125 | 375 |
| Butter + functional powder | 125 | 375 |

All samples were mixed for 5' in Thermomix.

The parameters of the texturizer used for the analysis were as follows:

| Probe: cylinder P05 | |
|---|---|
| Test mode | Compression |
| Pre-test speed | 5 mm/s |
| Test speed | 5 mm/s |
| Post-test speed | 10 mm/s |
| Distance | 5 mm |
| Trigger type | auto |
| Trigger force | 5 g |

Figure 7A:
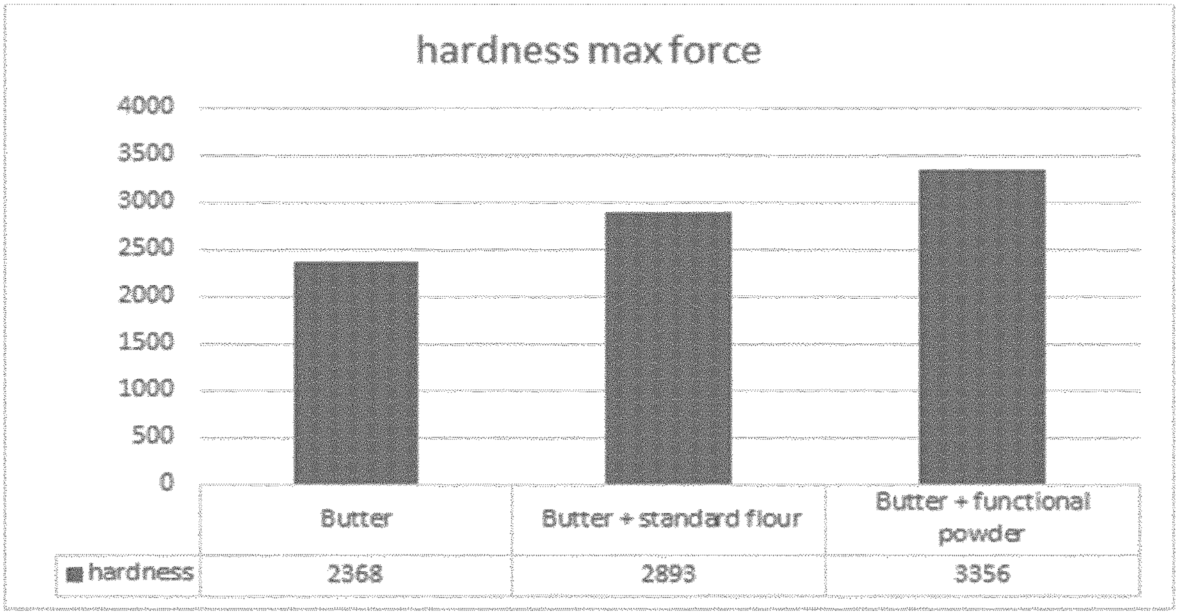
FIG. 7. Hardness measurement (A: hardness max force and B: hardness area) of a pure fat component (butter), said fat component comprising standard flour, and said fat component comprising a corresponding amount of the functional powder according to the invention (in this case gelatinized starch). As can be seen in both panels A and B, the hardness of the fat component comprising the functionalized powder is much higher than that of the same fat component whereto a corresponding amount of standard flour is added and even higher than that of the pure fat component.
Figure 7B:
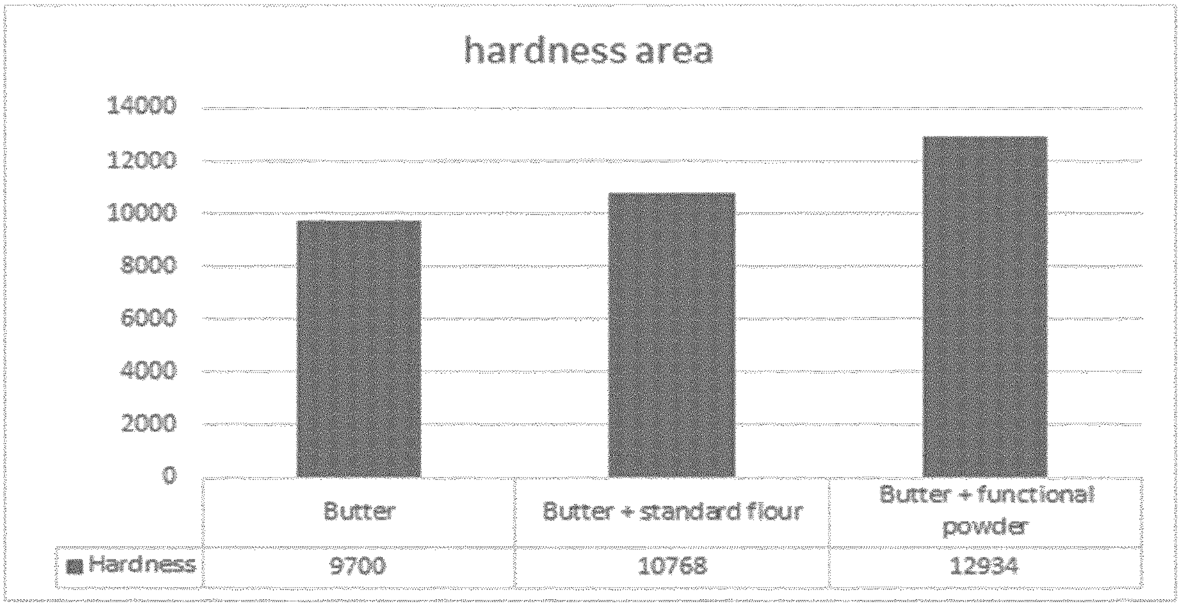

The results are depicted in FIG. 7 and show that the hardness (A: hardness max force and B: hardness area) of the fat component comprising the functional powder according to the invention (in this case gelatinized starch) is much higher than that of the same fat component whereto a corresponding amount of standard flour is added and even higher than that of the same fat component whereto no flour is added. This is important because it shows why the functional powder gives the fat component its characteristics that enable its ease of manipulation in a continuous line making it much more appropriate for inverse lamination, i.e. wherein the fat layer is on the outside of the dough.

The invention claimed is:

1. An industrial and continuous process for producing reversed laminated pastry dough comprising the steps of:

i) Preparing a laminating fat composition comprising: a fat component and from 0.1 to 40 wt. % of a functional ingredient increasing the water and fat binding capacity and viscosity of the laminating fat, wherein said functional ingredient has a water holding capacity of equal to or greater than 0.8 as measured by standard method AACC N° 88-04;

ii) Preparing a dough premix composition comprising: between 40 and 70 g water for every 100 g flour, and kneading said premix into a dough;

iii) Feeding of the laminating fat composition obtained in (i) and the dough obtained in (ii) in separate extruders that are configured so as to form a continuous sheet of reversed laminated dough comprising a sheet of dough between two sheets of laminating fat composition upon extruding;

iv) Extruding the laminating fat composition and dough through said separate extruders, resulting in sheet of pre-dough in between 2 sheets of laminating fat composition;

v) Reducing the thickness of the fat-dough-fat sheet by means of one or more calibrators, optionally by adding flour at the bottom of the fat-dough-fat sheet by means of a flouring device located before and/or after each one or more calibrator;

vi) Folding the fat-dough-fat sheet multiple times to obtain a reversed multilayer laminated dough;

vii) Optionally allowing the reversed multilayer laminated dough to rest at a temperature of between 0 and 15° C. for at least 30 minutes to up to 24 hours;

viii) Reducing the reversed multilayer laminated dough into sheets of between 40 mm to 2 mm by means of one or more calibrators;

wherein in all steps the reversed multilayer dough is maintained at a temperature of between 0 and 20° C.

2. The process according to claim 1, wherein said functional ingredient to be mixed into the laminating fat composition is selected from: pre-gelatinized wheat or starch flour, hydrocolloids and dietary fibers.

3. The process according to claim 1, wherein the flour is selected from wheat, or blend comprising wheat flour, rye flour, spelt flour, durum flour, or whole meal.

4. The process according to claim 1, wherein the flour used for the dough premix has a water absorption capacity of between 40 and 70, measured with a standard farinograph according to a method adapted from standard AACC 54-21.02, with water at 30° C.

5. The process according to claim 1, wherein the flour used for the dough premix has a ratio of tenacity and extensibility (P/L) value of below 1.2 measured by an alveograph, wherein P is the maximum pressure, roughly equaling the resistance of the dough against extension and wherein L is the average length of the curve a rupture of the bubble roughly equaling the dough extensibility.

6. The process according to claim 1, which is performed on a fully industrial scale without human intervention on the production line.

7. The process according to claim 1, wherein the fat composition represents between 12 and 40 wt. % of the final reversed multilayer laminated dough composition.

8. The process according to claim 1, wherein said dough premix further comprises one or more components selected from: sugar, gluten, improver, salt, yeast, sourdough, eggs and dairy ingredients such as milk, milk powder, buttermilk, whey.

9. The process according to claim 1, further comprising a step of proofing, and/or freezing the reversed multilayer laminated dough.

10. The process according to claim 1, wherein said fat composition of step i) is stored at a temperature between 0 and 15° C. for a period of minimum 30 minutes to up to 2 days or several weeks.

11. A raw reversed multilayer laminated dough food product obtained by the method according to claim 1.

12. The raw reversed multilayer laminated dough food product according to claim 11 selected from the group consisting of a reversed pastry or puff pastry dough product or sheet, a Danish pastry product, flaky pastry, jachnun, kubaneh, millefeuille, galette des Rois, Viennese pastry, croissant, chocolate roll, turnover and galette.

* * * * *